United States Patent [19]

Alfano et al.

[11] Patent Number: 5,454,954
[45] Date of Patent: Oct. 3, 1995

[54] SCALE CONTROL IN METAL MINING CIRCUITS USING POLYETHER POLYAMINO METHYLENE PHOSPHONATES

[75] Inventors: Nicholas J. Alfano, Pittsburgh; David M. Shenberger, Midway, both of Pa.

[73] Assignee: Calgon Corporation, Pittsburgh, Pa.

[21] Appl. No.: 333,588

[22] Filed: Nov. 2, 1994

Related U.S. Application Data

[63] Continuation of Ser. No. 124,920, Sep. 21, 1993, abandoned.
[51] Int. Cl.⁶ .................................................. C02F 5/14
[52] U.S. Cl. .......................... 210/700; 210/701; 252/180
[58] Field of Search .................... 210/698–701; 252/180, 181

[56] References Cited

U.S. PATENT DOCUMENTS

| | | | |
|---|---|---|---|
| 2,729,557 | 1/1956 | Booth et al. | 210/701 |
| 3,928,198 | 12/1975 | Brink, Jr. et al. | 210/764 |
| 4,618,448 | 10/1986 | Cha et al. | 252/180 |
| 4,640,793 | 2/1987 | Persinski et al. | 252/82 |
| 4,931,189 | 6/1990 | Dhawan et al. | 210/700 |
| 4,933,090 | 6/1990 | Gill et al. | 210/700 |
| 5,262,061 | 11/1993 | Gill et al. | 210/700 |
| 5,300,231 | 4/1994 | Cha | 210/700 |

FOREIGN PATENT DOCUMENTS

0302651B1 7/1988 European Pat. Off. .

*Primary Examiner*—Peter A. Hruskoci
*Attorney, Agent, or Firm*—Craig G. Cochenour; Diane R. Meyers; William C. Mitchell

[57] ABSTRACT

A composition useful as a deposit control agent to control the formation, deposition and adherence of scale in the process of extracting precious metals from an ore comprising (I) an aqueous slurry of a mining circuit having the ore, and (II) from about 5 to 500 ppm, based on the total weight of (I), of (a) from about 50 to 100 weight percent, based on the weight of (II), of a polyether polyamino methylene phosphonate, and (b) from about 0.1 to 50 weight percent, based on the weight of (II), of a polymer. A method for inhibiting calcium scale in one or more aqueous systems of a mining circuit employing this composition is also provided.

9 Claims, No Drawings

SCALE CONTROL IN METAL MINING CIRCUITS USING POLYETHER POLYAMINO METHYLENE PHOSPHONATES

This application is a continuation of Ser. No. 08/124,920, filed Sep. 21, 1993, now abandoned.

BACKGROUND OF THE INVENTION

1. Field of the Invention

The present invention relates to compositions and methods employing this composition for controlling and/or inhibiting the formation, deposition and adherence of calcium deposits on surfaces of an aqueous system employed in the process of extracting precious metals.

2. Brief Description of the Background Art

Most industrial waters contain alkaline earth metal cations such as, for example, calcium, barium, magnesium, etc., and several anions such as bicarbonate, carbonate, sulfate, oxalate, phosphate, silicate, fluoride, etc. When these anions or cations or combinations thereof are present in concentrations which exceed the solubility of their reaction products, precipitates form until these product solubility limitations are no longer exceeded. For example, when calcium ion and sulfate ion or calcium ion and carbonate ion concentrations exceed the solubility of their calcium sulfate or calcium carbonate reaction products, respectively, a solid phase of calcium sulfate or calcium carbonate will form.

Solubility concentrations are exceeded for various reasons, such as partial evaporation of the water phase, a change in pH, pressure or temperature, or the introduction of additional ions which form insoluble compounds with the ions already present in the solution.

As these reaction products precipitate on surfaces of an aqueous system, they form scale or deposits. This accumulation prevents effective heat transfer, interferes with fluid flow and facilitates corrosive processes and biological activity. Scaling is an expensive problem in many industrial systems, causing delays and shutdowns for cleaning and removal.

Calcium sulfate scaling is particularly troublesome in the mining of refractory grade ores using oxidation methods such as, for example, but not limited to, flash chlorination, roasting with air or pressure oxidation wherein aqueous ore slurries are oxidated under high temperatures generally greater than 400° Fahrenheit and/or pressure conditions generally greater than 400 pounds per square inch to prepare the ore for leaching. It will be appreciated that calcium sulfate scaling occurs in autoclaves, flash chlorination vessels, roaster apparatus, and in leaching facilities such as, for example, in bioleaching operations, and on clarifier rakes, pumps, and related piping employed in the process of extracting precious metals.

U.S. Pat. No. 3,928,196 discloses the use of copolymers of 2-acrylamido-2-methylpropylsulfonic acid and acrylic acid as scale inhibitors.

U.S. Pat. No. 4,640,793 discloses the use of admixtures containing carboxylic acid/sulfonic acid polymers and phosphonates or polycarboxylates as scale and corrosion inhibitors.

U.S. Pat. No. 4,618,448 discloses the use of polymers comprising an unsaturated carboxylic acid, an unsaturated sulfonic acid and an unsaturated polyalkylene oxide as scale inhibitors.

U.S. Pat. No. 4,933,090 discloses the use of hexamethylenediamine tetramethylenephosphonic acid and diethylene pentamethylenephosphonic acid in combination with carboxylic/sulfonic acid polymers to control silica/silicate deposition.

Compositions containing hexamethylenediamine tetramethylenephosphonic acid, polyacrylic acid and a carboxylic/sulfonic acid polymer are used in papermaking to control calcium sulfate scaling.

European Publication No. 302651B1 discloses the use of carboxylic acid/sulfonic acid copolymers in combination with organic phosphonates and acrylic acid-type polymers as calcium carbonate scale inhibitors in highly alkaline aqueous systems.

None of these, however, disclose or suggest the instant invention, which relates to calcium and/or sulfate control on the process of extracting precious metals.

It will be understood by those skilled in the art that the process of extracting precious metals includes, but is not limited to, for example, controlling and/or inhibiting calcium sulfate compounds and/or calcium carbonate compounds on metallic, activated carbon and the surfaces of one or more aqueous systems involved in heap and vat leaching, carbon-in-pulp leaching, carbon-in-leach leaching, activated carbon leaching and adsorption recovery systems, or mill water circuits used to carry out the cyanidation process for extracting precious metals from crude ores. It is well known by those skilled in the art that the cyanidation process is combined with the use of activated carbon to recover precious metals such as, for example, gold or silver from large volumes of solutions or slurries containing water soluble cyanide salts of the precious metals created by the leaching step of the cyanidation process. Because oxidizing conditions must be maintained in order for the cyanidation process to proceed, about 1 to 2 pounds per short ton of ore of sodium hydroxide or lime is added to keep the system at an alkaline pH of about 10–11. Acid is generated during cyanidation and the alkaline pH prevents cyanide degeneration, which can lead to the formation of deadly HCN gas. While lime is significantly less expensive than sodium hydroxide in achieving alkaline pH's, it suffers from the disadvantage of causing the formation of calcium carbonate scale deposits at various points in the aqueous systems involved in the cyanidation process.

Because of the high pH's and alkalinity involved in the cyanidation processes described above, conventional agents such as, for example, polyacrylates and polymaleic anhydrides used to control calcium carbonate scale in more traditional areas such as boilers or cooling water do not give satisfactory performance in the process of extracting precious metals in an aqueous system.

Thus, it is a significant contribution of the composition and method of the present invention that by the addition of effective amounts of the present composition it is possible to substantially inhibit the formation of such calcium carbonate scale deposits, thereby allowing the use of the less expensive lime, rather than sodium hydroxide, in maintaining alkaline pH's for the cyanidation process.

Further, for example, in the severe environment of the metal mining circuits described hereinabove, conventional scale inhibitors such as polymaleates and polyacrylic acid have generally proven to be ineffective as calcium sulfate scale inhibitors. By contrast, the compositions of the instant invention, as described herein, effectively control calcium sulfate scaling in these mining circuits employing water.

Thus, in spite of this background material, there remains a very real and substantial need for a composition and methods employing the composition for substantially controlling and/or inhibiting the formation, deposition and adherence of calcium carbonate and/or calcium sulfate scale deposits on surfaces of an aqueous system employed in the process of extracting precious metals.

SUMMARY OF THE INVENTION

The present invention has met the above-described needs. The present invention provides a composition useful as a deposit control agent for controlling the formation, deposition and adherence of scale, including for example calcium carbonate and/or calcium sulfate compounds, in the process of extracting precious metals from an ore comprising: (I) an aqueous slurry of a mining circuit having the ore; and (II) from about 5 to 50 ppm, based on the total weight of (I), of (a) from about 50 to 100 weight % based on the weight of (II), of a polyether polyamino methylene phosphonate of the formula (I)

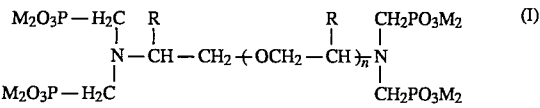

wherein n is an integer or fractional integer which is, or on the average is, from about 2 to 12, M is hydrogen or an alkali metal selected from the group consisting of sodium, potassium, lithium and rubidium, and R may be the same or different and is independently selected from hydrogen and methyl; and (b) from about 0.1 to 50 weight %, based on the weight of (II), of a polymer selected from one or more members of the group consisting of homo- and copolymers including terpolymers comprising one or more of acrylamide, acrylic acid, 2-acrylamide-methyl propane sulfonic acid, methacrylic acid, itaconic acid, polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salts thereof, and vinyl phosphonic acid, wherein the weight average molecular weight for said members is in the range of from about 500 to 250,000.

In a preferred embodiment of this invention, the composition as described herein is provided wherein in formula (I) M is hydrogen, R is methyl and n is, or on average is, from about 2 to 3, and most preferably n is an average of 2.6.

In a preferred embodiment of this invention, the composition, as described herein, includes from about 0.1 to 50 weight %, based on the weight of II, of an aminomethylene phosphonic acid or an aminomethylenephosphonate.

Another embodiment of this invention provides a method for inhibiting calcium sulfate compounds and/or calcium carbonate compounds scaling in one or more aqueous systems of a mining circuit comprising adding to the mining circuit an effective amount of the composition of this invention, as described herein, based on the total weight of the aqueous system. The method further includes introducing to the aqueous system of the mining circuit the polyether polyaminomethylene phosphonate component and the polymer component of this invention as a single blended composition, or the polyether polyamino methylene phosphonate component, the polymer component and the aminomethylenephosphonic acid component of this invention as a single blended composition, or alternatively, independently introducing one or a combination of two of these components as separate compositions to the aqueous system of the mining circuit.

DETAILED DESCRIPTION OF THE INVENTION

The instant invention is directed to a composition and use thereof for controlling the formation, deposition and adherence of scale, including for example calcium carbonate compounds and/or calcium sulfate compounds, on the surfaces of one or more aqueous systems employed in the process of extracting precious metals from an ore.

As used herein, the term "precious metal(s)" refers to metals such as, but not limited to, gold, silver and copper.

As used herein, the term "active basis" means the concentration of polymer based on the solids in the stock solution.

As used herein, the term "mining circuit" refers to the process of mining and, more specifically, the process of extracting precious metals from, for example, refractory grade and/or oxide grade ores.

As used herein, the term "effective amount" refers to that amount of a composition necessary to bring about a desired result such as, for example, the amount of a composition needed to achieve substantial control of the formation, deposition and/or adherence of scale in the process of extracting precious metals from an ore in an aqueous system of a mining circuit. Generally, the effective amount will range from 0.1 to greater than 500 ppm of the instant composition based on the total weight of the ore slurry being treated, and preferably from about 1 to 250 ppm.

As used herein, the term "inhibiting calcium sulfate scaling" encompasses threshold precipitation inhibition, stabilization, dispersion, solubilization, sequestration, reducing adherence of scale to system surfaces and/or particle size reduction. Thus, the inventors have discovered that the instant compositions effectively inhibit calcium sulfate scaling under severe operating conditions.

The term "aqueous system" as used herein, is meant to include any type of aqueous mining system prone to calcium sulfate deposition, and specifically includes ore slurries of oxidation mining circuits such as pressure oxidation circuits. Oxidation circuits are most commonly found in gold and copper mining operations, among others. These ore slurries generally contain up to about 40% solids.

The present invention provides a composition useful as a deposit control agent to control the formation, deposition, and adherence of scale, including such as for example calcium carbonate and/or calcium sulfate compounds in the process of extracting precious metals from an ore comprising: (I) an aqueous slurry of a mining circuit having the ore; and (II) from about 5 to 500 ppm, based on the total weight of (I), of (a) from about 50 to 100 weight %, based on the weight of (II), of a polyether polyamino methylene phosphonate of the formula (I)

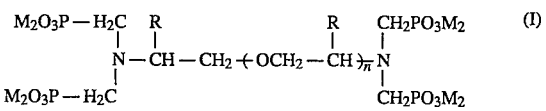

wherein n is an integer or fractional integer which is, or on the average is, from about 2 to 12, M is hydrogen or an alkali metal selected from the group consisting of sodium, potassium, lithium and rubidium, and R may be the same or different and is independently selected from hydrogen and methyl; and (b) from about 0.1 to 50 weight %, based on the weight of (II), of a polymer selected from one or more members of the group consisting of homo- and copolymers including terpolymers comprising one or more of acrylamide, acrylic acid, 2-acrylamide-methyl propane sulfonic acid, methacrylic acid, itaconic acid, polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salts, thereof, and vinyl phosphonic acid, wherein the weight average molecular weight for the members is in the range of from about 500 to 250,000.

In another embodiment of this invention, formula (I) of component (a) of the present composition, as hereinbefore described, includes wherein M is hydrogen, R is methyl, and n is, or on the average is, from about 2 to 3, and more preferably n is an average of 2.6.

In a preferred embodiment of this invention, component (b) of the instant composition, as described herein, is a polymer having one or more members selected from the group consisting of (i) acrylic acid/2-acrylamide-methyl propane sulfonic acid having a weight percent of from about 90/10 to 10/90, (ii) about 100 by weight percent acrylic acid, (iii) sodium styrene sulfonate/maleic anhydride having a weight percent of about 75/25, (iv) acrylic acid/methacrylic acid/itaconic acid having a weight percent of about 33/33/34, (v) acrylic acid/acrylamide having a weight percent of about 50/50, (vi) acrylic acid/2-acrylamide-methyl propane sulfonic acid/polyethylene glycol monomethacrylate-5 (having 5 repeating oxyethylene units) having a weight percent of about 70/20/10, and (vii) acrylic acid/2-acrylamide-methyl propane sulfonic acid/t-butyl acrylamide having a weight percent of about 70/20/10. More preferably, component (b) is a polymer of acrylic acid/2-acrylamide-methyl propane sulfonic acid having a weight percent of about 75/25, and most preferably a weight percent of about 60/40.

In another embodiment of this invention, a composition, as described hereinabove is provided including from about 0.1 to 50 weight percent, based on the weight of (II), of an aminomethylenephosphonic acid or an aminomethylenephosphonate. More preferably, the aminomethylenephosphonic acid is selected from the group consisting of hexamethylenediaminetetramethylenephosphonic acid, diethylenetriamine penta methylene phosphonic acid, and sodium salts thereof. The aminomethylenephosphonate is, such as for example, the sodium salt of hexamethylenediaminetetramethylenephosphonate. The acid form, hexamethylenediaminetetramethylenephosphonic acid is commercially available from Monsanto, St. Louis, Mo.

In a most preferred embodiment of the present invention, a composition as described herein, is provided wherein component (a) is the polyether polyamino methylene phosphonate of formula (I) wherein n is an integer or fractional integer from about 2 to 12, M is hydrogen and R is methyl, component (b) is a terpolymer of acrylic acid/2-acrylamide-methyl propane sulfonic acid/polyethylene glycol monomethacrylate, having a weight percent of about 70/20/10 and wherein the aminomethylenephosphonic acid is hexamethylene diamine tetramethylene phosphonic acid.

It will be appreciated that the aqueous slurry or aqueous system of the mining circuit generally includes ores in various states such as, for example, but not limited to, refractory grade ores and oxide grade ores.

It will be understood by those skilled in the art that the polyether polyamino methylene phosphonate component, the polymer component and the aminomethylenephosphonic acid or aminomethylenephosphonate component of the instant composition, as described herein, are water soluble or water dispersible.

In another embodiment of this invention, a method is provided for inhibiting calcium compounds, such as for example, calcium carbonate and/or calcium sulfate compounds, scaling in one or more aqueous systems of a mining circuit comprising adding to the mining circuit an effective amount of a composition, based on the total weight of the aqueous system of the mining circuit, comprising (a) from about 50 to 100 weight percent, based on the weight of the composition, of a polyether polyamino methylene phosphonate of the formula (I)

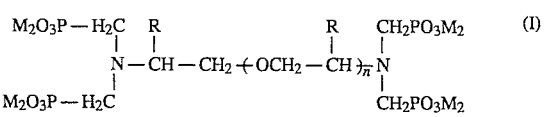

wherein n is an integer or fractional integer which is, or on the average is, from about 2 to 12, M is hydrogen or an alkali metal selected from the group consisting of sodium, potassium, lithium and rubidium, and R may be the same or different and is independently selected from hydrogen and methyl; and (b) from about 0.1 to 50 weight percent, based on the total weight of the composition, of a polymer selected from one or more members of the group consisting of homo- and copolymers including terpolymers comprising one or more of acrylamide, acrylic acid, 2-acrylamide-methyl propane sulfonic acid, methacrylic acid, itaconic acid, polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salts thereof, and vinyl phosphonic acid, wherein the weight average molecular weight for the members is in the range of from about 500 to 250,000.

Preferably, the method of this invention, as described herein, includes wherein in formula (I) M is hydrogen, R is methyl and n is, or on the average is, from 2 to 3, and most preferably n is an average of 2.6.

In another embodiment of the invention, a method is provided, as described hereinabove, including wherein (b) is a polymer having one or more members selected from the group consisting of (i) acrylic acid/2-acrylamide-methyl propane sulfonic acid having a weight percent of from about 90/10 to 10/90, (ii) about 100 weight percent acrylic acid, (iii) sodium styrene sulfonate/maleic anhydride having a weight percent of about 75/25, (iv) acrylic acid/methacrylic acid/itaconic acid having a weight percent of about 33/33/34, (v) acrylic acid/acrylamide having a weight percent of about 50/50, (vi) acrylic acid/2-acrylamide-methyl propane sulfonic acid/polyethylene glycol monomethacrylate-5 (having 5 repeating oxyethylene units) having a weight percent of about 70/20/10, and (vii) acrylic acid/2-acrylamide-methyl propane sulfonic acid/t-butyl acrylamide having a weight percent of about 70/20/10.

More preferably, the method, as described hereinabove, includes wherein the polymer (b) is a polymer of acrylic acid/2-acrylamide-methyl propane sulfonic acid having a weight percent of about 75/25, and most preferably having a weight percent of about 60/40.

Another embodiment of the instant invention provides a method, as described hereinabove, including adding the composition, as described hereinabove, to the aqueous system of the mining circuit, wherein the composition includes from about 0.1 to 50 weight percent, based on the total weight of the composition of an aminomethylenephosphonic acid or an aminomethylenephosphonate, as described hereinabove.

EXAMPLES

The following examples demonstrate the invention in greater detail. These examples are not intended to limit the scope of the invention in any way. In the examples, the following products were used:

TRC-271 is a 28 weight % active acrylic acid/2-acrylamide-methyl propane sulfonic acid/polyethylene glycol monomethacrylate-5 terpolymer having a weight % of about 70/20/10 available from Calgon Corporation (Pittsburgh, Pa.).

TRC-289 is a polyether polyamino methylene phosphonate available from Calgon Corporation (Pittsburgh, Pa.).

$AM_6P$ is a hexamethylene diamine-tetra methylenephosphonic acid available from Monsanto (St. Louis, Mo.).

PAA is poly acrylic acid, a common known calcium sulfate scale inhibitor.

TRC-233i is a 28 weight % active acrylic acid/2-acrylamide methylpropane sulfonic acid copolymer available from Calgon Corporation (Pittsburgh, PA), comprising about 75% by weight acrylic acid and about 25% by weight 2-acrylamide methylpropane sulfonic acid.

EXAMPLES 1–10

In Examples 1–10 various formulations were tested for their effectiveness at substantially inhibiting calcium sulfate scale deposition at elevated temperatures at 95° Centigrade (C.). For each example the solution tested contained 2000 ppm Ca and 4800 ppm sulfate prepared from the chloride and sodium salts, respectively. A total volume of 200 ml of the solution was prepared containing a known concentration of the inhibitors to be tested as set forth in Table I. The solution pH was adjusted to 9.0. Each solution was then added to a 250 ml screw-top Erlenmeyer flask and placed in an oven thermostated at 95° C. After 24 hours each flask was removed, the solution was filtered, and analyzed for calcium. Results from these experiments are presented in Table I.

TABLE I

| Example | Inhibitor | Inhibitor Concentration (ppm) | Calcium (ppm) | % Inhibition |
|---|---|---|---|---|
| 1 | Control | — | 800 | — |
| 2 | TRC-289 | 5 | 1380 | 48 |
| 3 | TRC-289 | 15 | 2000 | 100 |
| 4 | TRC-289 | 25 | 2040 | 100 |
| 5 | TRC-271 | 5 | 1380 | 48 |
| 6 | TRC-271 | 25 | 1200 | 33 |
| 7 | TRC-233i | 5 | 1200 | 33 |
| 8 | TRC-289 | 5 | 2000 | 100 |
|   | TRC-271 | 5 |   |   |
| 9 | TRC-289 | 5 | 2040 | 100 |
|   | TRC-233i | 5 |   |   |
| 10 | PAA | 25 | 1160 | 30 |

Table I shows that for Example 2, employing 5 ppm of TRC-289 alone, only a 48% inhibition of calcium sulfate scale was achieved. Example 3 shows that one must employ 15 ppm of TRC-289 to achieve a 100% inhibition of calcium sulfate scale. In contrast, when the composition of the instant invention employing 5 ppm of TRC-289 and 5 ppm of TRC-271, a 100% inhibition of calcium sulfate scale is achieved. Table I shows that when 5 ppm of TRC-271, Example 5, alone is employed that only a 48% inhibition of calcium sulfate scale is achieved. Example 10 employed 25 ppm of polyacrylic acid that is known and employed commonly by those skilled in the art to inhibit calcium sulfate scale. Table I shows that polyacrylic acid inhibited only 30% of the calcium sulfate scale. It will be appreciated by those skilled in the art that the composition of the instant invention, Examples 8 and 9, when added to the aqueous system significantly improved controlling the precipitation of calcium sulfate scale, in comparison to the results obtained when either polyacrylic acid, polymer (TRC-271) or polyether polyamino methylene phosphonate (TRC-289) is used alone.

EXAMPLES 11–19

In Examples 11–19, various formulations were tested for their effectiveness in controlling and/or inhibiting calcium sulfate scale deposition at temperatures above 100° C. For each example, the solution tested contained 2000 ppm Ca and 4800 ppm $SO_4$ prepared from their chloride and sulfate salts, respectively. A volume of 200 ml of solution was prepared for each example containing the aforementioned concentrations of Ca and $SO_4$ and known quantities of the inhibitors as set forth in Table II. The final solution pH was adjusted to 9.5 by NaOH addition. For each example, approximately 80 ml of this solution was added to a teflon-lined Parr reaction vessel, the vessel was sealed, and placed in an oven thermostated at 150° C. After two hours each reaction vessel was removed from the oven, cooled for a few minutes with compressed air followed by a quench with a water spray, and final cooling was achieved in a bath of cool water. Each vessel was then opened, the solution was filtered, and the solution was analyzed for Ca. Results of these experiments are given in Table II for Examples 11–19.

TABLE II

| Example | Inhibitor | Inhibitor Concentration (ppm) | Calcium (ppm) | % Inhibition |
|---|---|---|---|---|
| 11 | Average Control | — | 1140 | — |
| 12 | TRC-289 | 25 | 1240 | 12 |
|   | TRC-271 | 5 |   |   |
| 13 | TRC-289 | 40 | 1940 | 93 |
|   | TRC-271 | 5 |   |   |
| 14 | TRC-289 | 50 | 2000 | 100 |
|   | TRC-271 | 10 |   |   |
| 15 | TRC-289 | 35 | 2000 | 100 |
|   | TRC-271 | 20 |   |   |
| 16 | TRC-289 | 25 | 1620 | 56 |
|   | $AM_6P$ | 10 |   |   |
|   | TRC-271 | 10 |   |   |
| 17 | TRC-289 | 50 | 2000 | 100 |
|   | $AM_6P$ | 5 |   |   |
|   | TRC-271 | 5 |   |   |
| 18 | TRC-289 | 20 | 2060 | 100 |
|   | $AM_6P$ | 20 |   |   |
|   | TRC-271 | 5 |   |   |
| 19 | PAA | 50 | 670 | 0 |

Table II shows that for the compositions of the instant invention, Examples 14, 15, 17 and 18, a 100% inhibition of calcium sulfate scale formation is achieved. Table II shows that, in contrast, PAA, a scale inhibitor well known and commonly used by those skilled in the art, provides no improvement in scale control over Example 11, the control of the experiment. Examples 12 and 16 of Table II show that by varying the inhibitor concentrations of the components of the composition of the instant invention effects the percent inhibition of calcium sulfate achieved.

The above examples, which simulated an environment with high solids concentration prone to calcium sulfate deposition, such as that in mining circuits, demonstrate that the composition of the claimed invention inhibits calcium sulfate deposit. This inhibition is recorded in Tables I and II as "Calcium (ppm)" which indicates the amount of calcium that remained in solution, i.e. did not precipitate out, upon treatment with various formulations of the claimed invention. A polyacrylic acid commonly used to inhibit calcium sulfate scale, however, was not effective at all at a pH of 9.5. (see Example 19). It will therefore be appreciated by those skilled in the art that the composition of the present invention and the method of using this composition to inhibit calcium scale deposition in one or more aqueous mining systems as described above significantly improve the efficiency and cost effectiveness of controlling and/or inhibiting calcium scale precipitation over conventional known phosphonate or polymer technology.

Whereas particular embodiments of the instant invention have been described for the purpose of illustration, it will be evident to those skilled in the art that numerous variations and details of the instant invention may be made without departing from the instant invention as defined in the appended claims.

What is claimed is:

1. A method for inhibiting calcium compounds scaling including calcium sulfate in one or more aqueous systems used to extract precious metals from an ore, having a pH of at least 9.0 and containing calcium sulfate comprising adding to said systems an effective amount of a composition, based on the total weight of said aqueous system, comprising:

(a) from about 50 to 100 weight percent, based on the total weight of said composition, of a polyether polyamino methylene phosphonate of the formula (I)

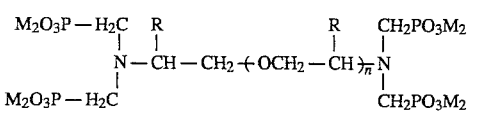

wherein n is an integer or fractional integer which is, or on the average is, from about 2 to 12, M is hydrogen or an alkali metal selected from the group consisting of sodium, potassium, lithium and rubidium, and R may be the same or different and is independently selected from hydrogen and methyl; and (b) from about 0.1 to 50 weight percent, based on the total weight of said composition, of a polymer selected from one or more members of the group consisting of homo- and copolymers including terpolymers comprising one or more of acrylamide, acrylic acid, 2-acrylamide-methyl propane sulfonic acid, methacrylic acid, itaconic acid, polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salts thereof, and vinyl phosphonic acid, wherein the weight average molecular weight for said members is in the range of from about 500 to 250,000.

2. The method of claim 1 wherein said effective amount is from about 0.1 to 500 ppm.

3. The method of claim 1 wherein the formula (I) M is hydrogen, R is methyl, and n is, or on average is, from about 2 to 3.

4. The method of claim 3 wherein n is an average of 2.6.

5. The method of claim 1 wherein (b) is a polymer having one or more members selected from the group consisting of (i) acrylic acid/2-acrylamide-methyl propane sulfonic acid having a weight percent of from about 90/10 to 10/90, (ii) about 100 weight percent acrylic acid, (iii) sodium styrene sulfonate/maleic anhydride having a weight percent of about 75/25, (iv) acrylic acid/methacrylic acid/itaconic acid having a weight percent of about 33/33/34, (v) acrylic acid/acrylamide having a weight percent of about 50/50, (vi) acrylic acid/ 2-acrylamide-methyl propane sulfonic acid/polyethylene glycol monomethacrylate-5 (having 5 repeating oxyethylene units) having a weight percent of about 70/20/10, and (vii) acrylic acid/2-acrylamide-methyl propane sulfonic acid/t-butyl acrylamide having a weight percent of about 70/20/10.

6. The method of claim 4 wherein (b) is a polymer of acrylic acid/2-acrylamide-methyl propane sulfonic acid having a weight percent of about 75/25.

7. The method of claim 4 wherein (b) is a polymer of acrylic acid/2-acrylamide-methyl propane sulfonic acid having a weight percent of about 60/40.

8. The method of claim 1 wherein said composition includes from about 0.1 to 50 weight percent, based on the total weight of said composition, of an aminomethylenephosphonic acid or an aminomethylenephosphonate.

9. The method of claim 8 wherein said aminomethylenephosphonic acid is selected from the group consisting of hexamethylenediaminetetramethylenephosphonic acid and diethylenetriamine penta methylene phosphonic acid, or wherein said aminomethylenephosphonate is the sodium salt of hexamethylenediaminetetramethylenephosphonate.

* * * * *